(12) United States Patent
Pekari

(10) Patent No.: US 9,272,725 B2
(45) Date of Patent: Mar. 1, 2016

(54) STEERING WHEEL FOR A MOTOR VEHICLE AND PROCESS FOR PRODUCING A STEERING WHEEL

(75) Inventor: Christoph Pekari, Eutingen (DE)

(73) Assignee: Schipek GmbH, Horb (DE)

( * ) Notice: Subject to any disclaimer, the term of this patent is extended or adjusted under 35 U.S.C. 154(b) by 0 days.

(21) Appl. No.: 13/526,680

(22) Filed: Jun. 19, 2012

(65) Prior Publication Data

US 2012/0325045 A1 Dec. 27, 2012

(30) Foreign Application Priority Data

Jun. 22, 2011 (DE) .......................... 10 2011 104 994

(51) Int. Cl.
*B62D 1/06* (2006.01)
*B62D 1/04* (2006.01)

(52) U.S. Cl.
CPC ............ *B62D 1/06* (2013.01); *B62D 1/046* (2013.01); *Y10T 29/49488* (2015.01); *Y10T 74/20834* (2015.01)

(58) Field of Classification Search
CPC .............. B62D 1/11; B62D 1/06; B62D 1/04; B60R 21/02; B29L 2031/3047
USPC .................. 74/558, 558.5, 588.5, 552, 551.9; 29/894.1
See application file for complete search history.

(56) References Cited

U.S. PATENT DOCUMENTS

| | | | | |
|---|---|---|---|---|
| 3,802,291 | A * | 4/1974 | Young et al. ..................... | 74/552 |
| 4,782,872 | A * | 11/1988 | Moschini ........................ | 74/558 |
| 5,205,186 | A * | 4/1993 | Draxlmaier, Sr. ............... | 74/558 |
| 5,289,735 | A * | 3/1994 | Kato et al. ..................... | 74/543 |
| 5,802,718 | A * | 9/1998 | Raetsen ........................ | 74/558 |
| 6,079,292 | A * | 6/2000 | Raetsen ........................ | 74/558 |
| 6,386,063 | B1 * | 5/2002 | Hayashi et al. ................. | 74/552 |
| 6,412,365 | B1 * | 7/2002 | Nagata et al. .................. | 74/558 |
| 6,668,683 | B2 * | 12/2003 | Fleckenstein ................... | 74/552 |
| 6,892,607 | B2 * | 5/2005 | Hayashi et al. ................. | 74/558 |
| 7,210,372 | B2 * | 5/2007 | Adachi et ....................... | 74/558 |
| 7,741,581 | B2 * | 6/2010 | Kreuzer et al. ............... | 219/204 |
| 2001/0023622 | A1 * | 9/2001 | Testa .............................. | 74/558 |

(Continued)

FOREIGN PATENT DOCUMENTS

| | | |
|---|---|---|
| DE | 1 194 273 A | 6/1965 |
| DE | 600 17 640 T2 | 3/2006 |

(Continued)

OTHER PUBLICATIONS

Description EP1069023. European Patent Office: Espacenet Patent Search. Jan. 26, 2014. http://translationportal.epo.org/emtp/translate/?ACTION=description-retrieval&COUNTRY=EP&ENGINE=google&FORMAT=docdb&KIND=A1&LOCALE=en_EP&NUMBER=1069023&OPS=ops.epo.org&SRCLANG=fr&TRGLANG=en.*

(Continued)

*Primary Examiner* — Daniel Yabut
(74) *Attorney, Agent, or Firm* — Renner, Otto, Boisselle & Sklar, LLP

(57) ABSTRACT

A steering wheel for a motor vehicle, with a steering wheel base body and a jacket that comprises at least one strip surrounding the steering wheel base body on the outer circumference. A first free end of the at least one strip is held in position securely in a groove formed in the steering wheel base body. A second free end of the at least one strip is also held in position securely in a groove formed in the base body of the steering wheel. In addition, the invention concerns a process for the production of such a steering wheel.

13 Claims, 3 Drawing Sheets

(56) References Cited

U.S. PATENT DOCUMENTS

| | | | |
|---|---|---|---|
| 2007/0153535 A1* | 7/2007 | Bostick | 362/488 |
| 2008/0202282 A1* | 8/2008 | Bassett et al. | 74/552 |
| 2009/0151506 A1 | 6/2009 | Haart et al. | |
| 2009/0178509 A1* | 7/2009 | Seidl | 74/558 |

FOREIGN PATENT DOCUMENTS

| | | |
|---|---|---|
| DE | 10 2007 028 201 A1 | 12/2008 |
| DE | 102007028201 A1 | 12/2008 |
| EP | 1 069 023 A1 | 1/2001 |
| EP | 1069023 A1 * | 1/2001 |
| EP | 1069023 A1 | 1/2005 |
| EP | 1 964 751 A2 | 9/2008 |
| GB | 980 673 A | 1/1965 |

OTHER PUBLICATIONS

Description DE102007028201. European Patent Office: Espacenet Patent Search. Jan. 26, 2014. http://translationportal.epo.org/emtp/translate/?ACTION=description-retrieval&COUNTRY=DE&ENGINE=google&FORMAT=docdb&KIND=A1&LOCALE=en_EP&NUMBER=102007028201&OPS=ops.epo.org&SRCLANG=de&TRGLANG=en.*

PCT/DE2012/100178 International Preliminary Report on Patentability mailed Jun. 4, 2013 (Including English Translation).

* cited by examiner

STEERING WHEEL FOR A MOTOR VEHICLE AND PROCESS FOR PRODUCING A STEERING WHEEL

CROSS-REFERENCE TO RELATED APPLICATION

The present application claims priority under 35 USC §119 to German Patent Application No. 10 2011 104 994.4 filed Jun. 22, 2011, the entire disclosure of which is incorporated herein by reference.

TECHNICAL FIELD OF THE INVENTION

The invention concerns a steering wheel for a motor vehicle with a steering wheel base body and a jacket that comprises at least one strip surrounding the steering wheel base body on the outer circumference. A first free end of the at least one strip is held in position securely in a groove formed in the steering wheel base body. In addition, the invention concerns a process for producing such a steering wheel.

DESCRIPTION OF THE RELATED ART

DE 10 2007 028 201 A1 describes a leather-jacketed steering wheel. Two strips of leather are sewn together at a first end. In order to achieve an especially good positioning ability of the two leather strips on the steering wheel rim, the sewn-together ends of the two leather strips are clamped in a groove that is formed along the steering wheel rim in its circumferential direction extending around the hub of the steering wheel. After placing the sewn-together ends into the groove, the leather strips are then placed on the surface of the steering wheel rim on its outer circumference. Then, the free ends of the two leather strips are connected by means of a seam.

Also, it is known from prior art to provide only one leather strip for enclosing the steering wheel rim, with the width of the strip corresponding essentially to 2πr, and r being the radius of a cross-sectional surface of the steering wheel rim. The length of the leather strip corresponds to the length of the steering wheel rim in the direction that extends around the hub of the steering wheel. On its two ends, this leather strip receives a pre-stitched seam. When the leather strip is then placed around the steering wheel rim, its facing edges form a butt joint. The stitches of the pre-stitched seam are then connected with each other. The connecting seam to be used for this, for example an Indianapolis seam, is produced by hand because a sewing machine cannot be used when the leather strip is arranged on the steering wheel rim. Even with steering wheel jackets where the steering wheel rim does not have a pure torus shape and where, as a consequence, the strip has a complex basic form, it is usually necessary to sew together the two free ends of the strip on the steering wheel manually.

This hand sewing of the jacket of a steering wheel is very labor intensive and therefore very costly.

SUMMARY OF THE INVENTION

This invention therefore addresses the problem of creating a steering wheel and a process as described above that lends itself to a much less costly production.

Advantageous embodiments with practical developments of the invention are given in the related claims.

With the motor vehicle steering wheel according to the invention, a steering wheel base body and a jacket are provided, with the jacket comprising at least one leather strip surrounding the steering wheel base body on its outer circumference. A first free end of the at least one strip is held in position securely in a groove formed in the steering wheel base body. A second free end of the at least one strip is also held in position securely in a groove formed in the steering wheel base body. This means that, after the placement of the jacket on the steering wheel base body, none of the ends of the strip need to be sewn together by hand; rather, the insertion of the ends into the at least one groove ensures the fixed position of the jacket on the steering wheel base body.

The at least one strip of the jacket is placed on the steering wheel base body so that it surrounds said body on its outer circumference and is held in position on the steering wheel base body by the clamping of its ends in the at least one groove. Since this eliminates the step of sewing together the jacket on the steering wheel, the production of the steering wheel is an especially low-cost operation.

In an advantageous embodiment of the invention, the jacket comprises a single strip, and the two free ends of the strip are held in one and the same groove. Such an attachment of the jacket to the steering wheel base body is distinguished by especially low cost. A (decorative) seam that is necessary for steering wheel jackets known from prior art is thereby completely eliminated.

A cosmetically especially attractive design of the steering wheel can be achieved when, according to another advantageous embodiment of the invention, the jacket comprises at least one first strip and at least one second strip. Here, the first free ends of the two strips are held in a first groove and the second free ends of the two strips are held in a second groove. Here, too, the jacket is fixed in position on the steering wheel base body by the insertion of the free ends in the associated groove, without manual sewing operations having to be performed on the steering wheel. In alternative embodiments, even more than two strips may be provided whose ends are fixed in associated grooves extending around the steering wheel rim in the circumferential direction of the steering wheel rim around the hub of the steering wheel.

It also proved to be advantageous if the free ends of the two strips held in a common groove were equipped with at least one mechanically sewn decorative seam. This decorative seam can be produced with a sewing machine prior to the insertion of the two ends into the groove so that a decorative seam will then be present on the steering wheel, as is the case with a decorative seam produced manually. After the mechanical sewing of the decorative seam, the free ends of the two strips carrying the decorative seam are then inserted into the common groove. This insertion of the free ends into the groove attaches the jacket to the steering wheel base body. In this way, various and complex decorative patterns can be provided on the jacket without having to produce them manually.

In addition, or as an alternative, the free ends of the two strips held in a common groove may be connected with at least one braid arranged in the common groove. Such a decorative braid, i.e. a strip folded once, will produce a cosmetically very attractive appearance of the steering wheel if it is implemented in a different color. The connection of the free ends of the two strips with the braid can be accomplished by means of mechanical sewing, i.e. before the jacket is attached to the base body of the steering wheel.

In order to improve the hold of the ends of the at least one strip in the associated groove, an adhesive may be provided. This adhesive may be arranged in the groove at least sectionally.

If, additionally or alternatively, adhesive is applied at least to sections of the steering wheel base body and/or to the inside of the jacket, the result is an especially secure attachment of the jacket to the steering wheel base body.

Lighting elements such as LEDs, luminous strips, etc. may be integrated in the groove and may be used for a decorative illumination of the surroundings of the steering wheel.

In the process according to the invention for producing a steering wheel for a motor vehicle, a steering wheel base body is equipped with a jacket that comprises at least one strip surrounding the steering wheel base body on its outer circumference. A first free end of the at least one strip is fixed in a groove that is formed in the steering wheel base body. A second free end of the at least one strip is also fixed in a groove that is formed in the steering wheel base body. Such an arrangement of the jacket on the steering wheel base body is an especially low-cost feature because sewing of the strip by hand is not required.

The advantages and preferred embodiments described above for the steering wheel according to the invention also apply to the process according to the invention for the production of a steering wheel.

The characteristics and combinations of characteristics referred to above in the description, as well as the characteristics and combinations of characteristics referred to below in the description of the figures and/or shown by themselves in the figures can be used not only in the specific combination referred to but also in other combinations or by themselves, without going beyond the scope of the invention.

Additional advantages, characteristics, and details of the invention follow from the claims, the description of preferred embodiments below, as well as from the figures in which identical or functionally equivalent elements are identified by identical reference symbols.

DETAILED DESCRIPTION OF THE INVENTION

Figure 1:
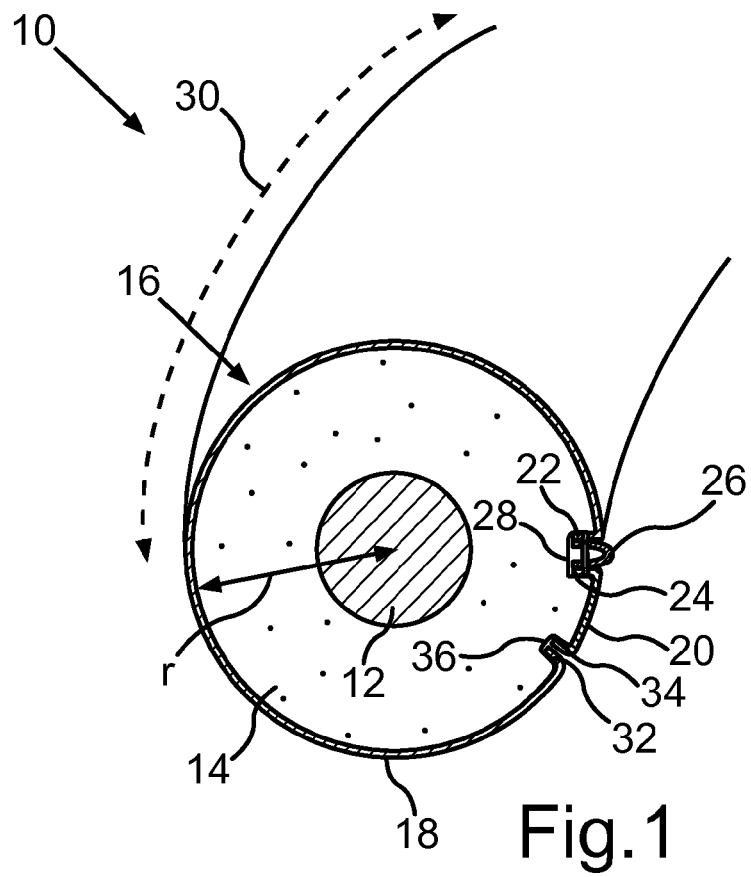
FIG. 1 shows a perspective, schematic section view of a steering wheel rim of a steering wheel where the free ends of two leather strips are held in associated grooves that are formed in the base body of a steering wheel rim extending in the circumferential direction of the steering wheel rim around the hub of the steering wheel.

FIG. 1 shows a schematic and simplified view of a steering wheel rim 10 of a steering wheel for a motor vehicle. The steering wheel rim 10 comprises a bearing structure 12 made of metal, for example an aluminum alloy, that is enclosed by a synthetic material, specifically a foam material 14. The base body of the steering wheel rim formed in this way has a radius r.

On its outer circumference, the base body is surrounded by a leather jacket 16 that comprises a first leather strip 18 and a second leather strip 20 in the embodiment shown in FIG. 1. A first free end 22 of the first leather strip 18 and a first free end 24 of the second leather strip 20 are sewn to a decorative braid 26. These two free ends 22, 24 and the decorative braid 26 are held in a groove 28 that is formed in the foam material 14 of the base body of the steering wheel rim 10. The groove 28 extends in a circumferential direction of the steering wheel rim 10 around a hub (not shown) of the steering wheel, with this circumferential direction identified by the double arrow 30 in FIG. 1.

A second free end 22 of the first leather strip 18 and a second free end of the second leather strip 20 are held in a second groove 36 that is arranged parallel to the first groove 28 in the base body of the steering wheel rim 10. This second groove 36 is also formed in the foam material 14 of the base body of the steering wheel rim 10.

Figure 2:
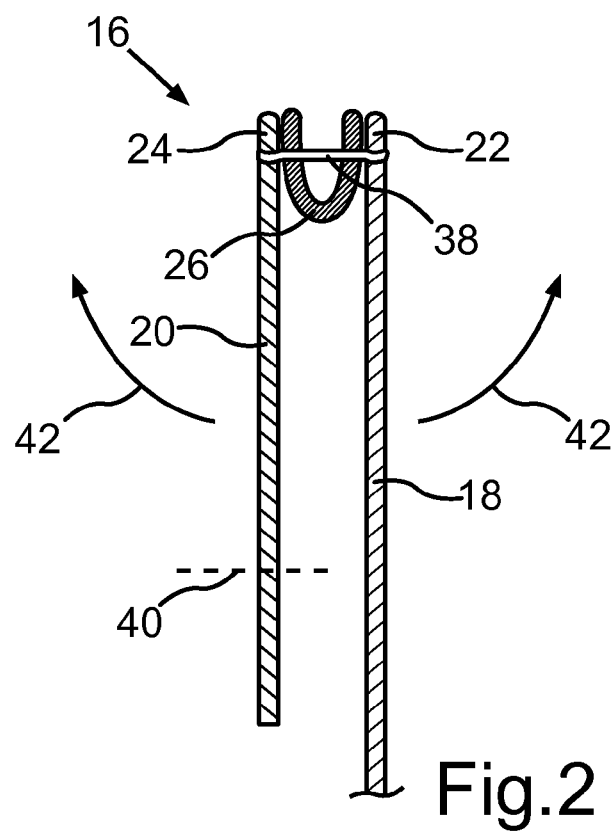
FIG. 2 shows the two leather strips whose first free ends are sewn to a decorative braid, prior to the arrangement of the two ends in one of the two grooves provided in the base body of the steering wheel rim.

During the production of the steering wheel, the two free ends 22, 24 of the two leather strips 18, 20 are first sewn to the decorative braid 26 (see FIG. 2). This is done before the two free ends 22, 24 are inserted into the first groove 28. The width of the two leather strips 18, 20 is selected so that it is easy to produce, by means of a sewing machine, a seam 38 that connects the leather strips 18, 20 with the decorative braid.

Figure 3:
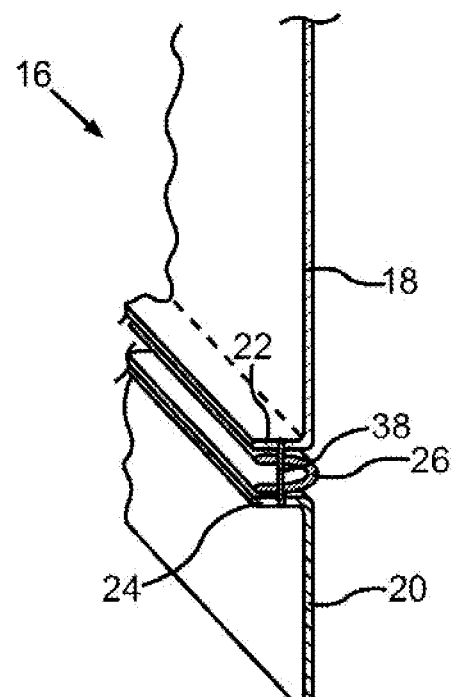
FIG. 3 shows the two ends of the leather strips connected with the decorative braid that form a seam that can be inserted into the groove.

After that, the narrow leather strip 20 is cut to the intended width. A mark 40 in FIG. 2 schematically indicates the place where the cutting is performed. Also, the wider leather strip 18 that surrounds the larger part of the base body of the steering wheel rim 10 is cut to the correct width, in such a way that the second free ends 32, 34 of the two leather strips 18, 20 can be inserted into the second groove 36. The arrows 42 in FIG. 2 illustrate the placement of the two leather strips 18, 20 that is performed in such a way that the first two free ends 22, 24 of the leather strips 18, 20 form a seam in conjunction with the decorative braid 26 (see FIG. 3).

After the cutting, the narrow leather strip 20 and the wider leather strip 18 have the correct width for jacketing the base body of the steering wheel rim 10. As can be seen from FIG. 3, the seam including the decorative braid 26 can then be inserted into the first groove 28 intended for this purpose.

Then, the two leather strips 18, 20 are placed around the base body of the steering wheel rim 10 in such a way that their free ends 32, 34 are located in the area of the second groove 36 (see FIG. 1). The two free ends 32, 34 are then clamped in the second groove 36 into which adhesive has been placed. In this way, it is possible to attach the leather jacket 16 to the base body of the steering wheel rim 10 without having to produce a seam by hand on the steering wheel.

Figure 4:
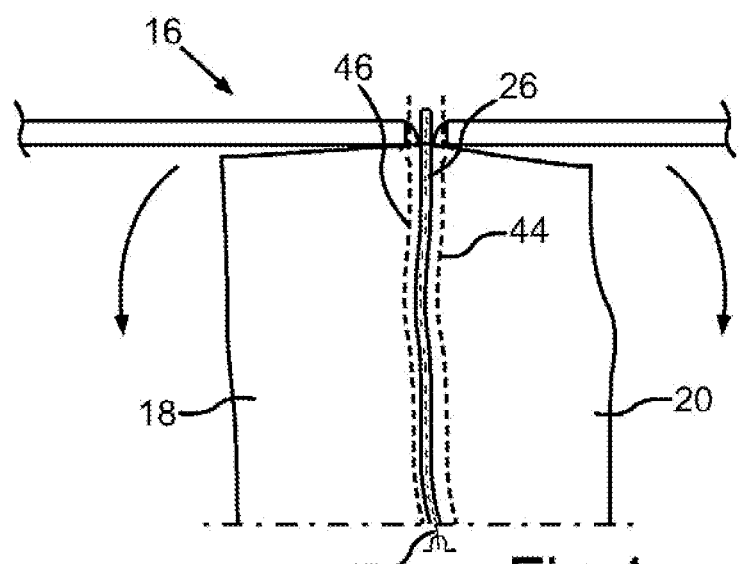
FIG. 4 shows a top view of the two leather strips each of which has—in addition to the decorative braid—a decorative seam at their end intended for insertion into the groove.

In the leather jacket 16 for the steering wheel rim 10 shown in FIG. 4, a decorative seam 44, 46 is provided in addition to the decorative braid 26 on the two leather strips 18, 20 in the area of their ends 22, 24 that are to be held in the groove 28. These decorative seams 44, 46 are also produced mechanically prior to the attachment of the leather jacket 16 to the base body of the steering wheel rim 10. It is also possible to produce just one or several decorative seams rather than the two decorative seams 44, 46 shown here by way of an example, and the decorative braid 26 may be eliminated.

Figure 5:
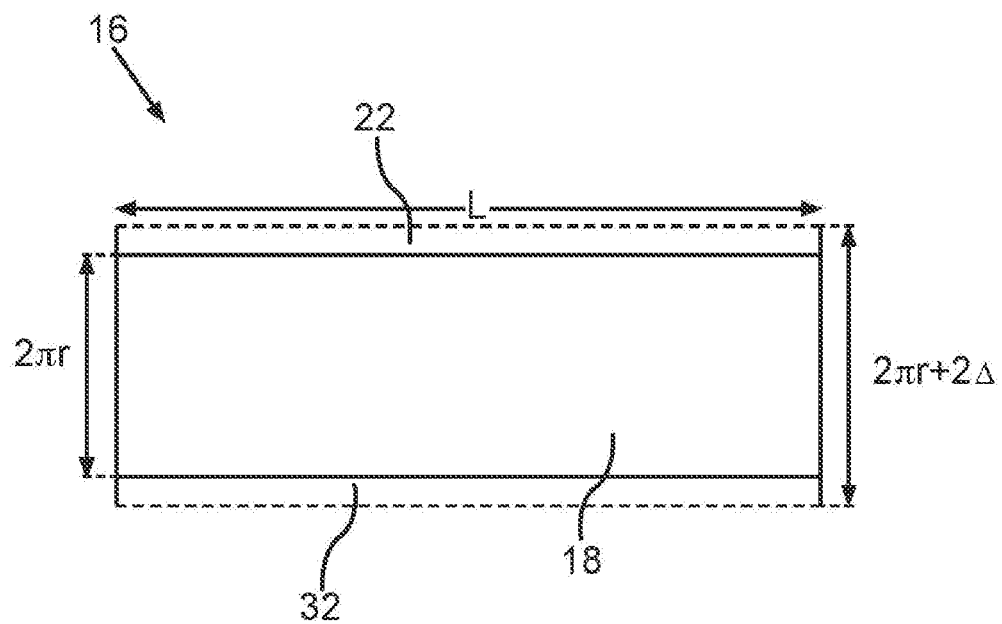
FIG. 5 shows a greatly simplified cutting of a single leather strip for jacketing a steering wheel rim whose base body comprises only one groove extending in the circumferential direction of the steering wheel rim around the hub of the steering wheel.

In another leather jacket 16 shown in FIG. 5, only the first leather strip 18 is provided for jacketing the base body of the steering wheel rim 10. Here, the length L corresponds to the outer circumference of the steering wheel rim 10 in the direction extending around the hub of the steering wheel, indicated in FIG. 1 by the double arrow 30.

Here, the width of the leather strip 18 is larger by the width of the two free ends 22, 32—i.e. by 2Δ—than the circumference 2πr of the base body of the steering wheel rim 10. This makes it possible to insert the free ends 22, 32 into the common groove 36 that is provided in the foam material 14 of the base body of the steering wheel rim 10. By fixing the two free ends 22, 32 of the leather strip 18 that are clamped in the groove 36, it is possible here, too, to eliminate the need for manual sewing of the leather strip 18 on the steering wheel. Since no decorative seam is provided in this embodiment, the groove 28 can be eliminated.

It is possible to apply an adhesive to the common groove 36 as well as to areas of the surface of the base body of the steering wheel rim 10 that face the leather jacket 16 in order to improve the attachment of the leather jacket 16 to the base body of the steering wheel rim 10.

Figure 6:
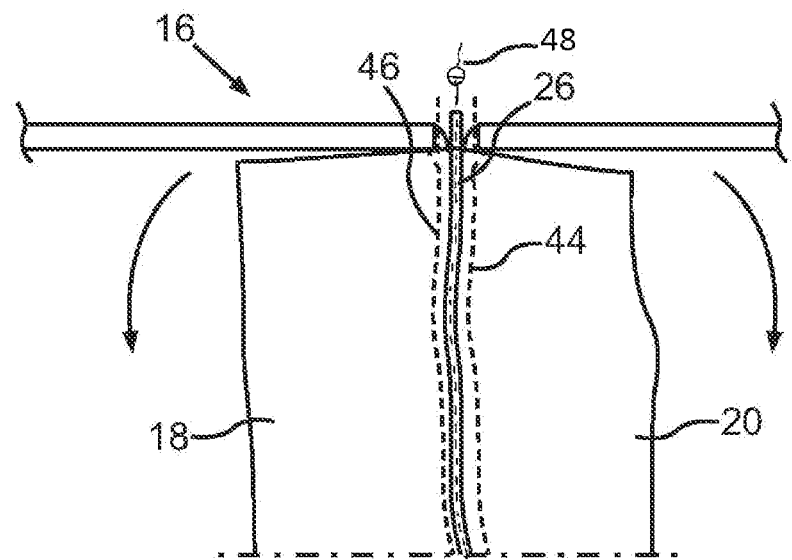
FIG. 6 shows a top view of the two leather strips in combination with LED lights.

In the groove 36, ambient lighting may be integrated, for example in the form of a luminous strip 47 (schematically shown in FIG. 4) or in the form of one (or several side-by-side) LED lights 48 (schematically shown in FIG. 6). This opens new possibilities for the illumination of the interior of a vehicle as well as—very generally—for the design of the interior that were not achievable before.

Although the invention has been shown and described with respect to certain preferred embodiments, it is obvious that equivalents and modifications will occur to others skilled in the art upon the reading and understanding of the specification. The present invention includes all such equivalents and modifications, and is limited only by the scope of the following claims.

The invention claimed is:

1. A steering wheel for a motor vehicle, including:
   a steering wheel base body having an outer circumference; and
   a jacket that includes:
      at least two strips surrounding the steering wheel base body on the outer circumference, each of the at least two strips including a first free end being held in position securely in a common first groove formed in the steering wheel base body and each of the at least two strips including a second free end also held in position securely in a second groove formed in the base body of the steering wheel,
      wherein the first free ends of the at least two strips being held in the common first groove are equipped with at least one mechanically sewn decorative seam in the common first groove, said at least one decorative seam mechanically sewn before placement in the common first groove,
      wherein the first free ends of the at least two strips held in the common first groove are connected with at least one braid arranged in the common first groove, and
      wherein the at least one braid includes a strip with an elongated portion having a single fold that extends in a longitudinal direction of the strip, the fold forming at least two sides, the at least two sides sewn to a respective first free end of the at least two strips.

2. The steering wheel according to claim 1, wherein the second free ends of the at least two strips are held in the second groove by an adhesive.

3. The steering wheel according to claim 1, wherein a lighting element is integrated in the common first groove.

4. The steering wheel according to claim 1, wherein the base body of the steering wheel includes a bearing structure that is surrounded by a synthetic material with the common first groove and the second groove formed in the synthetic material.

5. The steering wheel according to claim 1, wherein the first free ends of the at least two strips held in the first groove are mechanically sewn to the at least one braid arranged in the common first groove.

6. The steering wheel according to claim 1, wherein the base body of the steering wheel includes a metal bearing structure that is surrounded by a foam material with the common first groove and the second groove formed in the foam material.

7. The steering wheel according to claim 1, wherein the common first groove is more than twice as wide as a thickness of the first free ends to accommodate the longitudinally folded elongated portion of the strip.

8. A process for the production of a steering wheel for a motor vehicle including the steps of:
   connecting first free ends of at least two strips to at least one braid with a mechanically sewn decorative seam to form a jacket, wherein the at least one braid includes a strip with an elongated portion having a single fold that extends in a longitudinal direction of the strip, the fold forming at least two sides, the at least two sides sewn to a respective first free end of the at least two strips; and
   subsequent to connecting the first free ends with the mechanically sewn decorative seam, encasing a steering wheel base body having an outer circumference with the jacket so that the decorative seam is held in position in a first groove formed in the steering wheel base body of the steering wheel, and thereafter second free ends of the at least two strips are held in position along the outer circumference from the common first groove toward a second groove formed in the base body of the steering wheel.

9. A process according to claim 8, wherein the encasing step comprises arranging the braid with the first free ends in the first groove.

10. A process according to claim 8, wherein a lighting element is integrated in the first groove during sewing.

11. A process according to claim 9, wherein the common first groove is wider than a combined thickness of the first free ends to accommodate the longitudinally folded elongated portion of the strip.

12. A process according to claim 9, wherein the at least one braid as arranged in the common first groove extends between the first free ends and is at least partially radially outwardly spaced from the outer circumference of the steering wheel base body.

13. A process according to claim 9, wherein the at least one braid as arranged in the common first groove extends between the first free ends and is at least partially visible.

* * * * *